United States Patent
Lee et al.

(10) Patent No.: US 7,639,580 B2
(45) Date of Patent: Dec. 29, 2009

(54) OPTICAL DISK PLAYERS AND METHODS FOR DETECTING BURST CUTTING AREA (BCA) DATA IN A CONSTANT LINEAR VELOCITY MODE

(75) Inventors: Hyun-woong Lee, Seoul (KR); Dae-woong Kim, Seoul (KR)

(73) Assignee: Samsung Electronics Co., Ltd. (KR)

( * ) Notice: Subject to any disclaimer, the term of this patent is extended or adjusted under 35 U.S.C. 154(b) by 875 days.

(21) Appl. No.: 11/172,205

(22) Filed: Jun. 30, 2005

(65) Prior Publication Data
US 2006/0092798 A1    May 4, 2006

(30) Foreign Application Priority Data
Nov. 3, 2004    (KR)    .................. 10-2004-0088882

(51) Int. Cl.
G11B 7/00    (2006.01)
G11B 20/14    (2006.01)
G11B 7/005    (2006.01)

(52) U.S. Cl. ................ 369/53.16; 369/53.2; 369/59.19; 369/59.23; 369/52.1

(58) Field of Classification Search ................ None
See application file for complete search history.

(56) References Cited

U.S. PATENT DOCUMENTS

| | | | | |
|---|---|---|---|---|
| 6,034,934 A | * | 3/2000 | Miyake et al. ........... | 369/53.28 |
| 6,034,937 A | * | 3/2000 | Kumagai ................. | 369/47.26 |
| 6,618,333 B1 | * | 9/2003 | Chou et al. ............... | 369/47.36 |
| 7,061,850 B1 | * | 6/2006 | Irie et al. .................. | 369/59.24 |
| 7,116,615 B2 | * | 10/2006 | Yen .......................... | 369/47.35 |
| 2002/0060968 A1 | | 5/2002 | Senshu | |
| 2004/0066723 A1 | * | 4/2004 | Hou et al. ................. | 369/53.34 |
| 2004/0190420 A1 | * | 9/2004 | Yen et al. .................. | 369/59.19 |
| 2006/0092799 A1 | * | 5/2006 | Lee et al. .................. | 369/53.22 |

FOREIGN PATENT DOCUMENTS

| | | | |
|---|---|---|---|
| JP | 11073648 A | * | 3/1999 |
| JP | 2002-93059 A | | 3/2002 |
| KR | 10-0255208 B1 | | 2/2000 |
| KR | 10-0335069 B1 | | 1/2002 |

OTHER PUBLICATIONS

English machine translation of JP 11-073648 provided by the Japanese Patent Office.*

* cited by examiner

*Primary Examiner*—Wayne R Young
*Assistant Examiner*—Dionne H Pendleton
(74) *Attorney, Agent, or Firm*—Myers Bigel Sibley & Sajovec, P.A.

(57) ABSTRACT

Optical disk players include a disk spinning system that is configured to spin an optical disk at a constant linear velocity and a burst cutting area decoding system that is configured to decode data in a burst cutting area of the optical disk, while the optical disk is spinning at the constant linear velocity. The burst cutting area data decoding system may be configured to determine a rotational frequency of the optical disk while reading the data in the burst cutting area, and using the rotational frequency that was determined to decode the data in the burst cutting area that was read.

12 Claims, 7 Drawing Sheets

OPTICAL DISK PLAYERS AND METHODS FOR DETECTING BURST CUTTING AREA (BCA) DATA IN A CONSTANT LINEAR VELOCITY MODE

CROSS-REFERENCE TO RELATED PATENT APPLICATION

This application claims the benefit under 35 USC § 119 of Korean Patent Application No. 2004-0088882, filed on Nov. 3, 2004, the disclosure of which is hereby incorporated herein by reference in its entirety as if set forth fully herein.

FIELD OF THE INVENTION

The present invention relates to optical disk players and operating methods, and more particularly to detecting data coded in a burst cutting area (BCA) of an optical disk.

BACKGROUND OF THE INVENTION

Commonly, a device for reproducing data from an optical disk, such as a CD-RW, a CD-ROM, or a DVD-ROM, irradiates a track of the optical disk with a laser beam and detects reflected light to read contents, such as audio and/or video information. The optical disk has spiral tracks, the contents are coded and formed on the tracks with a pit pattern, and a predetermined pick-up device tracking the spiral tracks reads content information coded on the tracks using a laser. In some optical disk devices, the content information can be reproduced only if data coded in a BCA in the center of the optical disk is read in advance. Cutting areas and mirror areas are deployed in the BCA with a predetermined interval. The data coded in the BCA may be used as media identification information for determining whether the optical disk has been illegally duplicated. If the coded data is not properly recorded in the BCA, the optical disk cannot be reproduced. The BCA data generally is composed of a predetermined number of bytes, e.g., 188 bytes.

Figure 1:
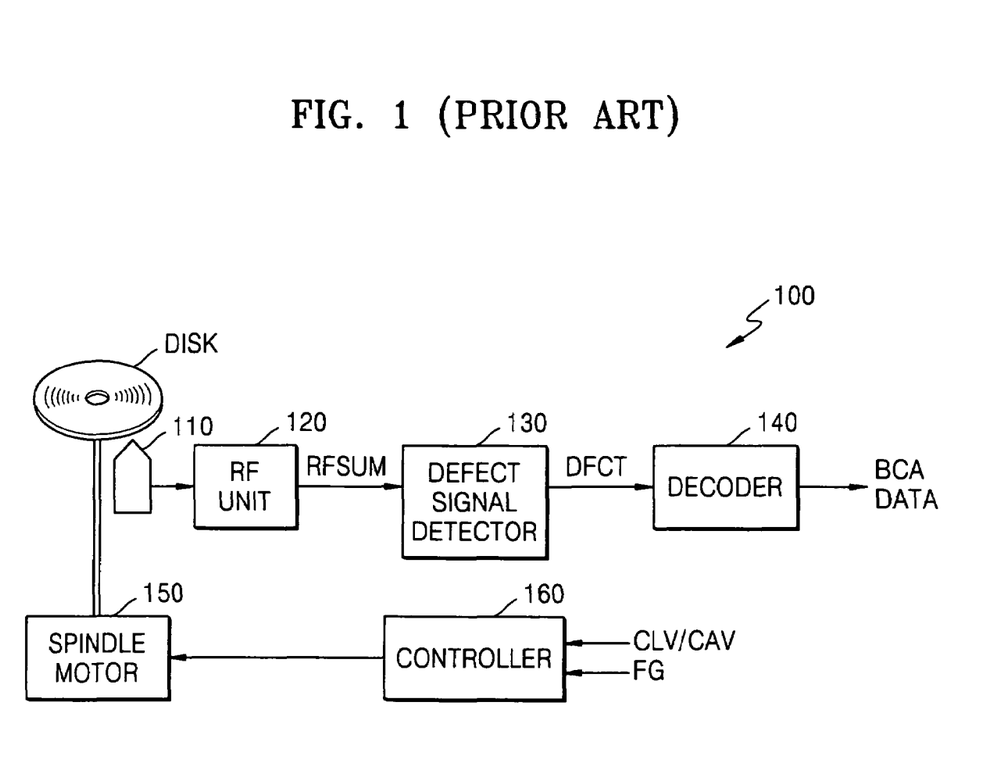
FIG. 1 is a block diagram of a conventional optical disk player.

FIG. 1 is a block diagram of a conventional optical disk player 100. Referring to FIG. 1, the conventional optical disk player 100 includes a pick-up unit 110, a radio frequency (RF) unit 120, a defect signal detector 130, a decoder 140, a spindle motor 150, and a controller 160. When the spindle motor 150 operates in a specific mode, the pick-up unit 110 reads information coded on an optical disk by radiating light onto the optical disk using a laser diode and photoelectrically converting light reflected back from the optical disk, and the RF unit 120 generates an RF signal RFSUM by combining the photoelectrically converted signal(s). The defect signal detector 130 detects a defect signal DFCT indicating a defect, such as a black dot or a scratch on the optical disk, from the RF signal RFSUM. The decoder 140 generates BCA data from the defect signal DFCT.

The controller 160 controls the spindle motor 150 to operate in a constant angular velocity (CAV) mode or constant linear velocity (CLV) mode, as desirable. More particularly, the CAV mode control is performed in order to read the BCA in a DVD series disk, and a disk rotation speed is around 1440 rpm. A frequency generation (FG) signal generally is used for the CAV mode control. A CAV motor also generally is used, and pins for the FG signal may need to be added to a chip, both of which can increase the cost and/or complexity of the device.

SUMMARY OF THE INVENTION

Optical disk players according to exemplary embodiments of the present invention include a disk spinning system that is configured to spin an optical disk at a constant linear velocity and a burst cutting area decoding system that is configured to decode data in a burst cutting area of the optical disk, while the optical disk is spinning at the constant linear velocity. In some embodiments, the burst cutting area data decoding system is configured to decode data in a burst cutting area of the optical disk, while the optical disk is spinning at the constant linear velocity, by determining a rotational frequency of the optical disk while reading the data in the burst cutting area, and using the rotational frequency that was determined to decode the data in the burst cutting area that was read. Analogous burst cutting area data decoding methods also may be provided. Accordingly, exemplary embodiments of the present invention can read BCA data by automatically detecting an optical disk rotational frequency in a CLV mode that need not use a CAV mode.

According to other exemplary embodiments of the present invention, an optical disk player includes an RF unit configured to generate an RF signal from information stored on an optical disk, for example, by combining signals photoelectrically converted by photodetectors of a pick-up unit from an optical disk. A defect signal detector is configured to generate a defect signal from the RF signal. An enable unit is configured to generate an edge interval value indicating a rotational frequency of the optical disk by checking leading edges of the defect signal and generating a latch pointer signal having a constant period from the edge interval value. A decoder is configured to generate BCA data by decoding the defect signal using the latch pointer signal.

The edge interval value indicating the rotational frequency may be the maximum or minimum edge interval value among interval values between the leading edges in one frame.

In some embodiments, the enable unit may include a frequency detector configured to detect edge signals indicating the leading edges, to update the edge interval value indicating the rotational frequency for a respective frame, and to output the updated interval value. A latch pointer generator is configured to generate the latch pointer signal based on the edge interval value indicating the rotational frequency and to compensate for a location of the latch pointer signal.

According to other exemplary embodiments of the present invention, exemplary BCA data decoding methods for optical disk players include generating an RF signal from information stored on an optical disk, for example by combining signals photoelectrically converted by photodetectors of a pick-up unit. A defect signal is generated from the RF signal. An edge interval value is generated, indicating a rotational frequency, by checking leading edges of the defect signal. A latch pointer signal is generated, having a constant period from the edge interval value. BCA data is generated by decoding the defect signal using the latch pointer signal.

DETAILED DESCRIPTION OF THE INVENTION

The present invention now will be described more fully hereinafter with reference to the accompanying drawings, in which illustrative embodiments of the invention are shown. However, this invention may be embodied in many different forms and should not be construed as limited to the embodiments set forth herein. Rather, these embodiments are provided so that this disclosure will be thorough and complete, and will fully convey the scope of the invention to those skilled in the art.

It will be understood that when an element is referred to as being "coupled", "connected" or "responsive" to another element, it can be directly coupled, connected or responsive to the other element or intervening elements may also be present. In contrast, when an element is referred to as being "directly coupled", "directly connected" or "directly responsive" to another element, there are no intervening elements present. Like numbers refer to like elements throughout. As used herein the term "and/or" includes any and all combinations of one or more of the associated listed items and may be abbreviated by "/".

It will also be understood that, although the terms first, second, etc. may be used herein to describe various elements, these elements should not be limited by these terms. These terms are only used to distinguish one element from another element.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The present invention is described in part below with reference to block diagrams and flowcharts according to embodiments of the invention. It will be understood that a block of the flowcharts and/or block diagrams, and combinations of blocks in the flowcharts and/or block diagrams can embody means, devices, methods and/or computer program products for implementing the functions/acts specified in the block or blocks.

Figure 2:
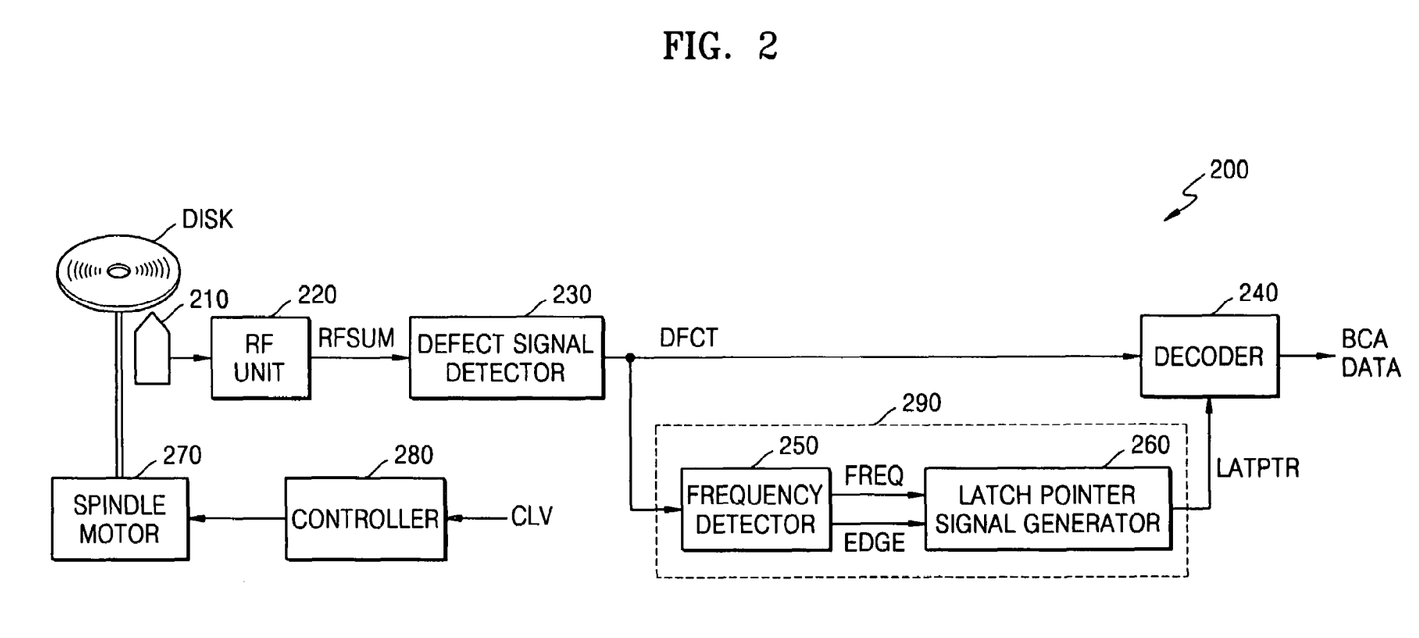
FIG. 2 is a block diagram of an optical disk player according to exemplary embodiments of the present invention.

FIG. 2 is a block diagram of an optical disk player 200 according to exemplary embodiments of the present invention. Referring to FIG. 2, the optical disk player 200 includes a pick-up unit 210, an RF unit 220, a defect signal detector 230, a decoder 240, an enable unit 290, a spindle motor 270, and a controller 280. Also, in order to reproduce information coded on an optical disk, the optical disk player 200 may include a sled motor (not shown) for moving the pick-up unit 210 and a servo processor (not shown) controlling the driving of motors. Many other conventional subsystems also may be included, as is well known to those having skill in the art.

The pick-up unit 210 may include four separate photodiodes (not shown), in order to photoelectrically convert light reflected from the optical disk when the optical disk is irradiated by a laser beam. The pick-up unit 210 reads information coded on the optical disk converting the reflected light using the photodiodes. The RF unit 220 generates an RF signal RFSUM by combining the photoelectrically converted signals output from the photodiodes.

The defect signal detector 230 generates a defect signal DFCT indicating the existence of a defect from the RF signal RFSUM. The RF signal RFSUM includes information coded on spiral tracks of the optical disk, and also noise caused by the presence of a defect such as a black dot or a scratch on the optical disk. The defect signal detector 230 generates the defect signal DFCT by extracting a defect noise component included in the RF signal RFSUM. The defect signal DFCT is also used to read cutting areas of a BCA. When reproducing, the defect signal DFCT can be used in order for a predetermined servo processor (not shown) to perform a noiseless tracking control.

Exemplary embodiments of the invention can read BCA data by automatically detecting a rotational frequency of the optical disk when the spindle motor 270 operates in the CLV mode under the control of the controller 280. The optical disk has spiral tracks in which content (e.g., digital data) is coded and formed with a pit pattern. Here, the content information can be reproduced only if data, i.e., media identification data, coded in the BCA in the center of the optical disk is read in advance.

To do this, the enable unit 290 checks leading edges of the defect signal DFCT, generates a maximum or minimum edge interval value FREQ of one frame, and generates a latch pointer signal LATPTR having a predetermined period from the edge interval value FREQ. The edge interval value FREQ is the maximum or minimum edge interval value among interval values of the leading edges of one frame, and is used to determine the rotational frequency of the optical disk. Here, the rotational frequency of the optical disk is a corresponding frequency for the CLV mode. The decoder 240 generates the BCA data by decoding a signal obtained by sampling the defect signal DFCT according to the latch pointer signal LATPTR. Unlike conventional CAV technology in which a rotation speed of an optical disk is maintained such at a fixed value, e.g., 1440 rpm, as under a CAV mode control, in the exemplary embodiments of the invention, BCA data can be reproduced using the latch pointer signal LATPTR when a constant linear speed is maintained regardless of the rotational speed of the optical disk.

Accordingly, optical disk players according to exemplary embodiments of the present invention include a disk spinning system, that can include elements 270 and 280 of FIG. 2, and that is configured to spin an optical disk at a constant linear velocity (CLV). A burst cutting area decoding system, that can include elements 220, 230, 240, 250, 260 and/or 290 of FIG. 2, is configured to decode data in a burst cutting area of the optical disk, while the optical disk is spinning at the constant linear velocity. The decoding may take place by determining a rotational frequency of the optical disk while reading data in the burst cutting area, and using the rotational frequency that was determined to decode the data in the burst cutting area that was read. The rotational frequency may be used directly, or may be used indirectly by detecting a period, an edge, an interval and/or other parameters, from the frequency that was determined.

Figure 5:
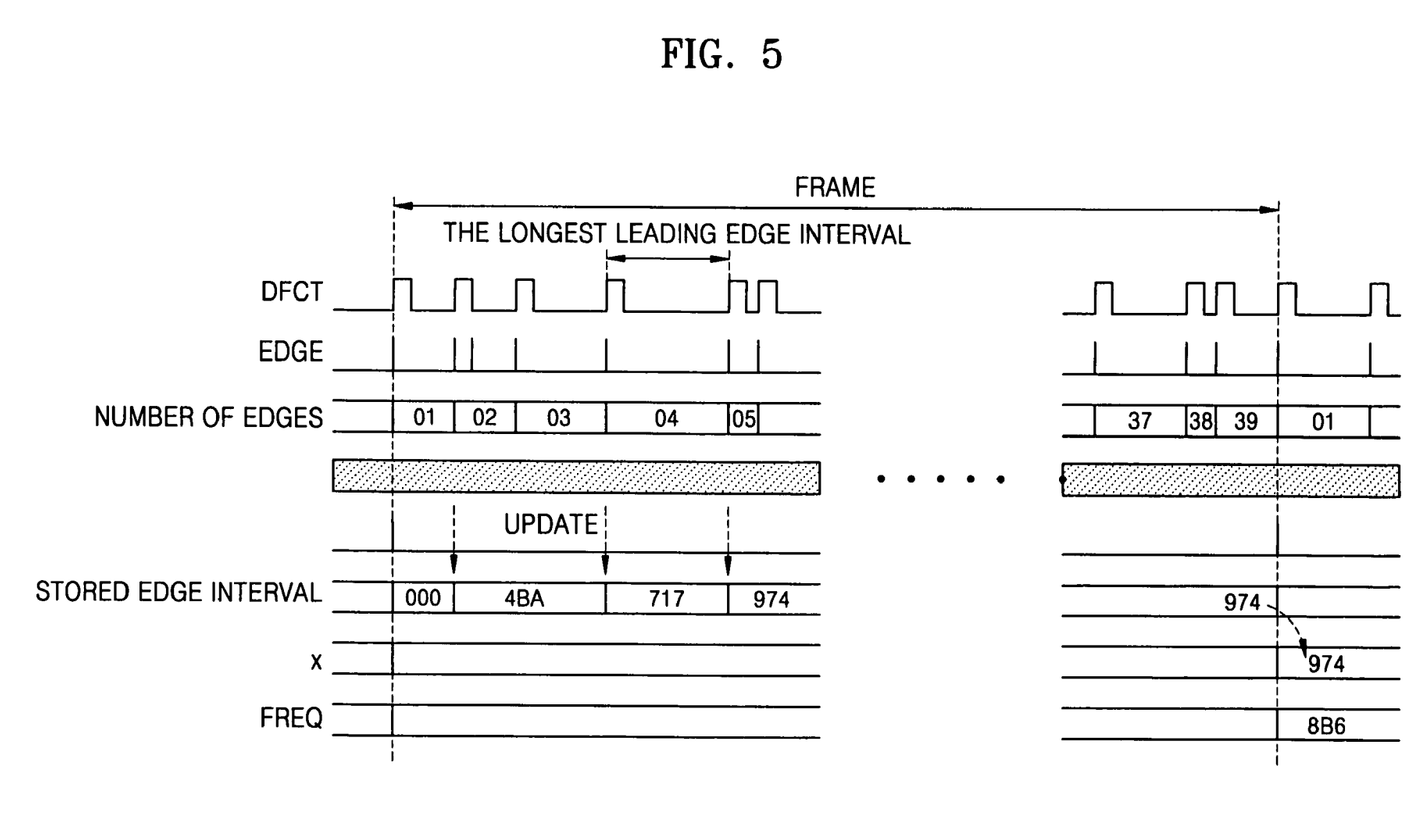
FIG. 5 is a timing diagram illustrating an update correlation between a defect signal and the maximum/minimum edge interval value according to exemplary embodiments of the invention.

The leading edges indicate beginning points of pulses generated several times in one frame as shown in a diagram of the defect signal DFCT of FIG. 5. In DVD series disks, the number of leading edges is determined as 39 times, there is a shortest interval and a longest interval between the leading edges, and intervals between the leading edges are an integer number of system clock cycles. For example, in the defect signal DFCT, the leading edges exist 3 times in a sync fixed pattern, 4 times in a sync code pattern, and 32 times in a data pattern. When a system clock frequency is 54 MHz and the minimum edge interval is 8.89 μs, the maximum edge interval can be determined as 4×8.89 μs. Here, the minimum edge interval can correspond to 480 cycles of the system clock, and the maximum edge interval can correspond to 1920 cycles of the system clock.

In exemplary embodiments of FIG. 2, the enable unit 290 includes a frequency detector 250 and a latch pointer signal generator 260. The frequency detector 250 detects an edge signal EDGE indicating the leading edges, updates the edge interval value FREQ indicating the rotational frequency for a respective frame, and outputs the updated edge interval value FREQ in the respective frame. The latch pointer signal generator 260 generates the latch pointer signal LATPTR based on the edge interval value FREQ indicating the rotational frequency, and compensates for a location of the latch pointer signal LATPTR. Compensation may be provided every time when the edge signal EDGE is active.

Figure 3:
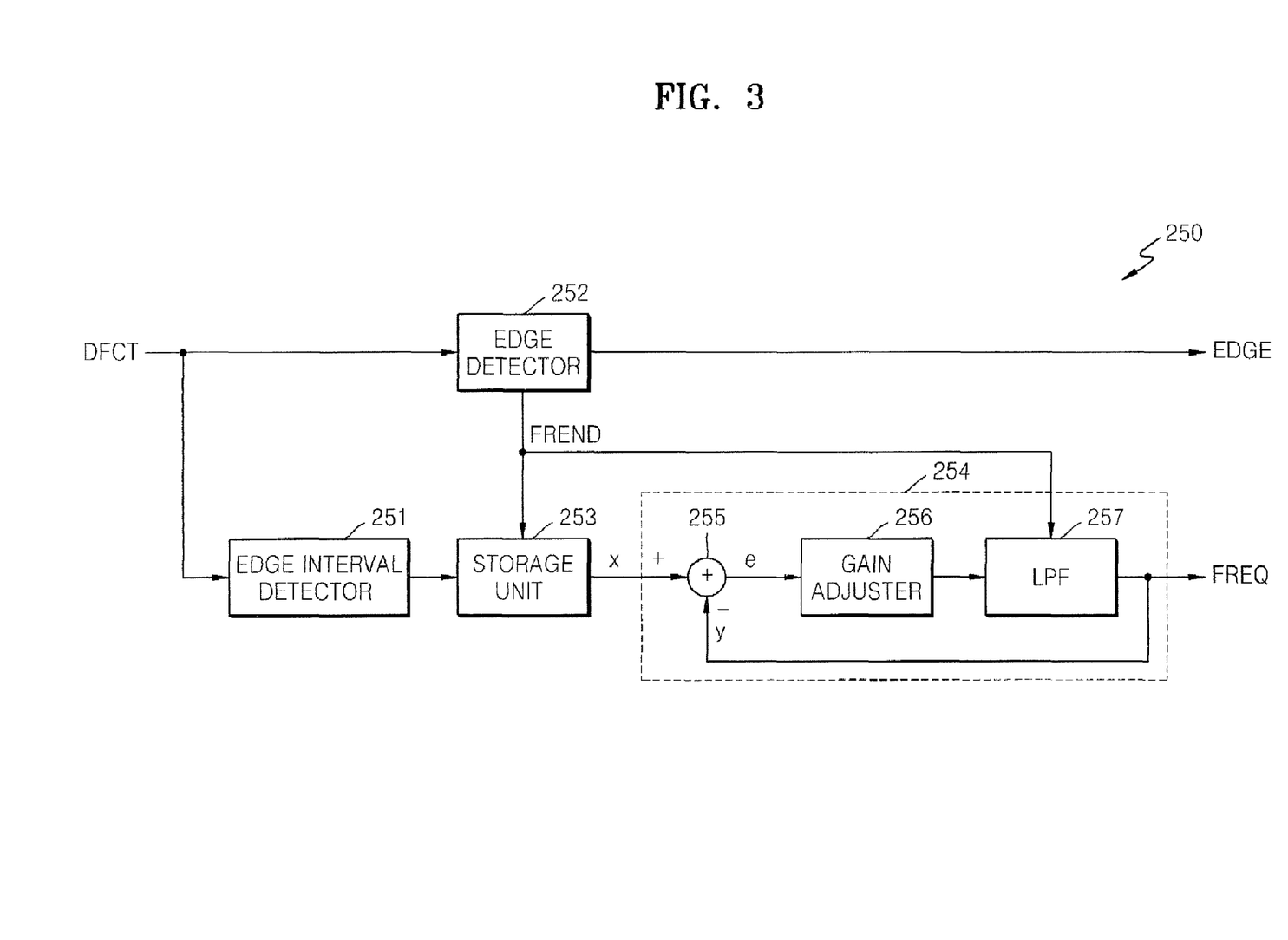
FIG. 3 is a detailed block diagram of a frequency detector of FIG. 2 according to exemplary embodiments of the invention.

FIG. 3 is a detailed block diagram of the frequency detector 250 of FIG. 2 according to exemplary embodiments of the invention. Referring to FIG. 3, the frequency detector 250 includes an edge interval detector 251, an edge detector 252, a storage unit 253, and a loop filter 254. An operation of the frequency detector 250 will now be described with reference to the flowchart of FIG. 4 and the timing diagram of FIG. 5.

Figure 4:
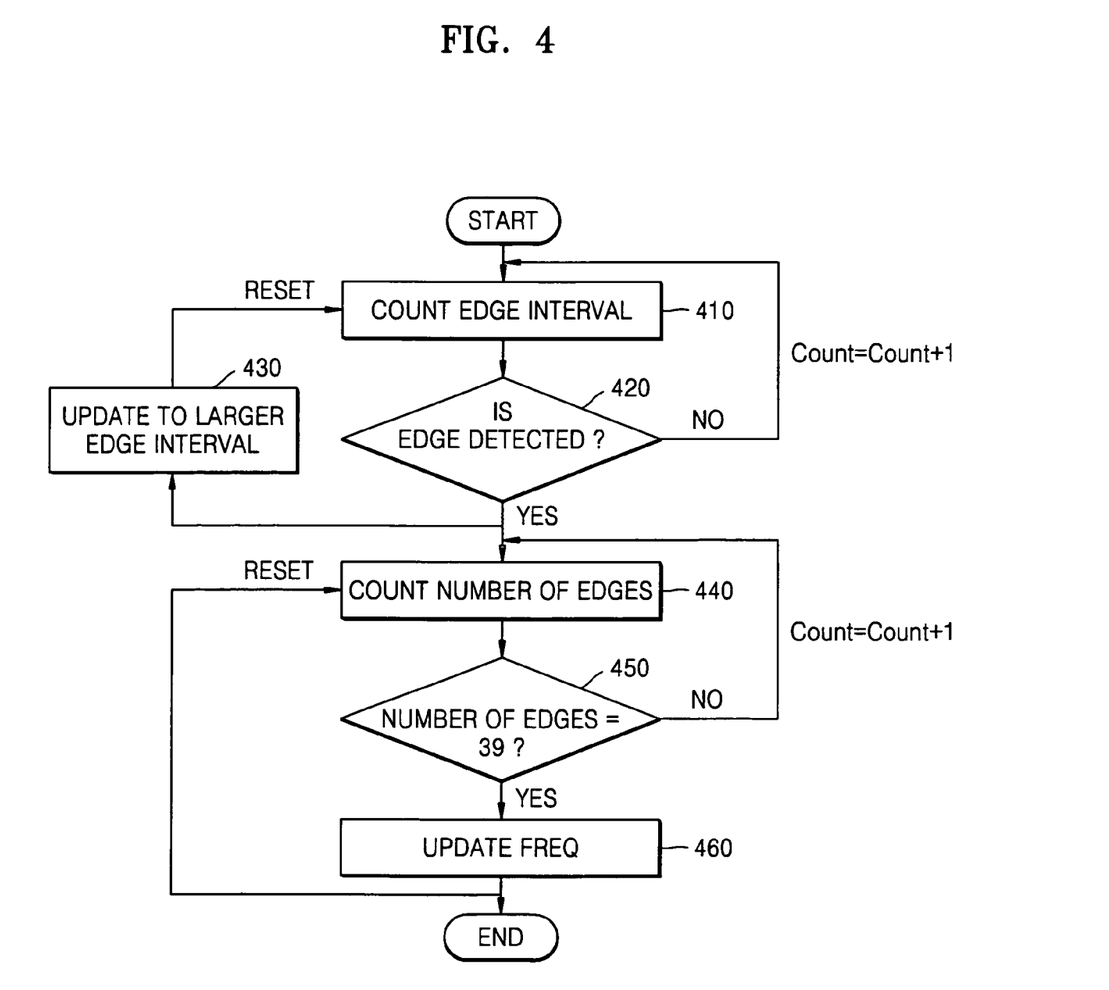
FIG. 4 is a flowchart illustrating an operation of a frequency detector according to exemplary embodiments of the invention.

The edge interval detector 251 counts edge intervals by checking leading edges of the defect signal DFCT, at Block 410. If a subsequent edge is not detected after a given edge, the edge interval detector 251 counts the number of system clock cycles between the two leading edges and increases the number of system clock cycles by 1, at Block 420. If the edge interval detector 251 detects the subsequent edge, the edge interval detector 251 outputs an edge interval value between a previous edge and a current edge. The storage unit 253 updates and stores the edge interval value output from the edge interval detector 251 only if it is larger than a previous edge interval value in one frame, at Block 430. If the lager edge interval value is updated and stored in the storage unit 253, the edge interval detector 251 resets the number of system clock cycles and counts an edge interval value until a subsequent edge is detected. Accordingly, the storage unit 253 stores a maximum edge interval value x updated in one frame. As described above, the maximum edge interval value x is used to obtain a rotational frequency of an optical disk, and a minimum edge interval value of one frame, which can be counted in the same way as described above, can be used instead of the maximum edge interval value x.

The edge detector 252 detects the edge signal EDGE by checking the leading edges of the defect signal DFCT, and counts the number of edges, at Block 440. If the counted number of edges does not equal the number of edges of one frame (39), the edge detector 252 counts the number of edges and increases the number of edges by 1 every time when an edge is detected, at Block 450. If the counted number of edges equals the number of edges of one frame (39), the edge detector 252 generates a frame signal FREND, indicating one frame. The storage unit 253 maintains and outputs the maximum edge interval value x updated in a previous frame during a subsequent frame according to the frame signal FREND. The edge detector 252 resets the number of edges counted in every frame and counts the number of edges until every subsequent frame is detected.

To deal with jitter minutely changing a rotation speed of an optical disk, the maximum edge interval value x stored in the storage unit 253 may be filtered, for example by a first order infinite impulse response (IIR) low pass filter (LPF). The first order IIR LPF operating as the loop filter 254 outputs a value y obtained by filtering the updated maximum edge interval value x in response to the frame signal FREND as the edge interval value FREQ, indicating a rotational frequency, at Block 460. In FIG. 3, the loop filter 254 includes a subtractor 255, a gain adjuster 256, and an LPF 257. The subtractor 255 generates an error value e by subtracting the filtered value y from the updated maximum edge interval value x. The gain adjuster 256 outputs an adjustment value obtained by adjusting a reflection degree of the error value e. The LPF 257 outputs the filtered value y by low-pass-filtering the adjustment value in response to the frame signal FREND. The LPF 257 outputs a value beginning from a predetermined initial value and increased or decreased by a predetermined value in every frame according to the error value e as the filtered value y. For example, if the adjustment value obtained by reflecting the size of the error value e is getting larger, the LPF 257 outputs a value obtained by increasing the predetermined initial value at a predetermined rate as the filtered value y, and if the adjustment value obtained by reflecting the size of the error value e is getting smaller, the LPF 257 outputs a value obtained by decreasing the predetermined initial value at a predetermined rate as the filtered value y. In the case of the 54 MHz system described above, 1920 clock cycles can be used as the predetermined initial value. FIG. 5 illustrates a timing diagram in which the maximum edge interval value x=974 updated in the storage unit 253 is changed to the filtered value y=8B6 filtered by the LPF 257.

Figure 6:
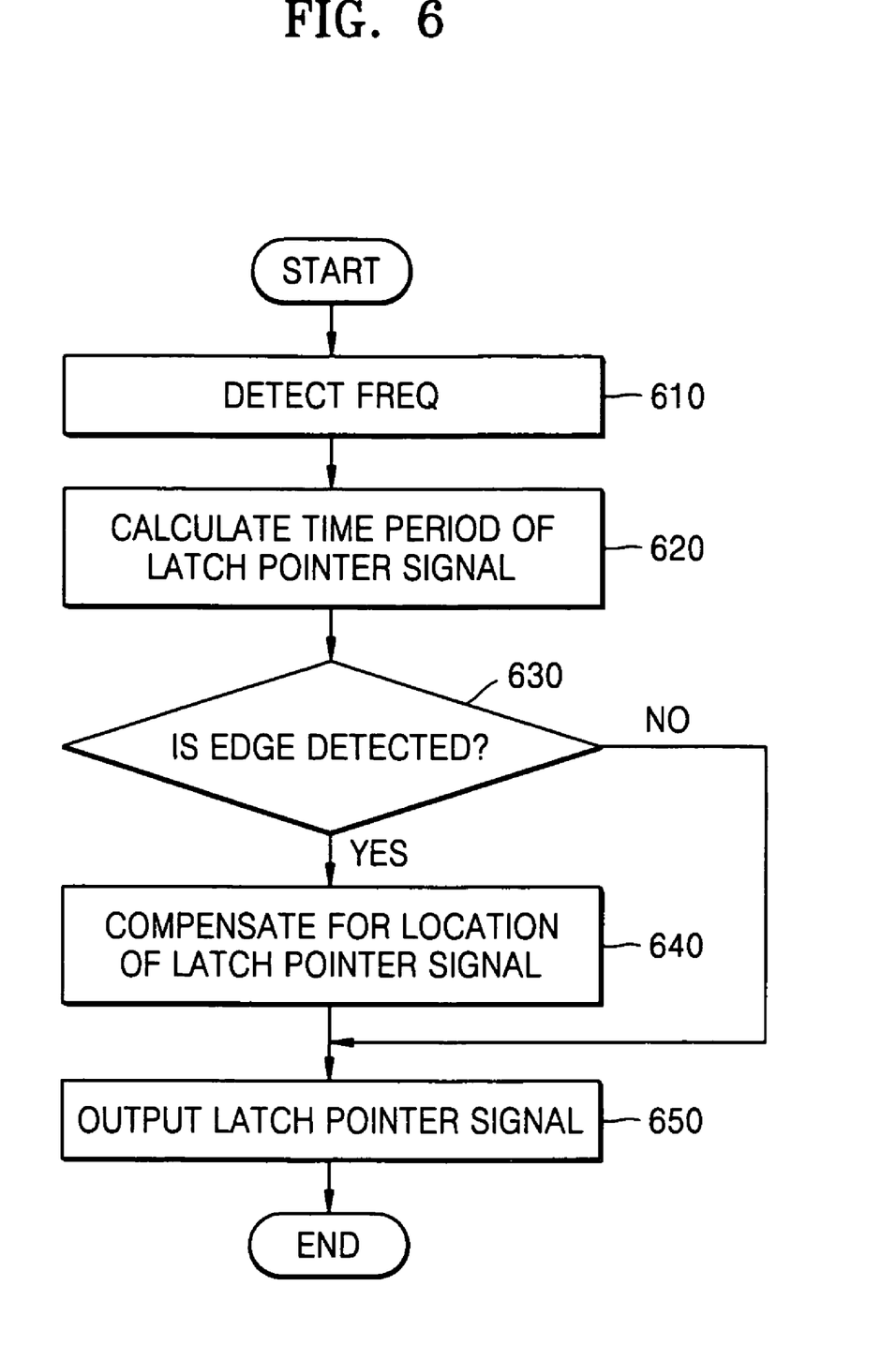
FIG. 6 is a flowchart illustrating an operation of a latch pointer signal generator of FIG. 2 according to exemplary embodiments of the invention.

FIG. 6 is a flowchart illustrating operations of a latch pointer signal generator 260 of FIG. 2 according to exemplary embodiments of the invention. Referring to FIG. 6, when the frequency detector 250 detects the edge interval value FREQ indicating a rotational frequency at Block 620, the latch pointer signal generator 260 generates a latch pointer signal having a time period obtained by dividing the edge interval value FREQ by a constant (which may be an integer) at Block 620. The edge interval value FREQ is divided by the constant in order to obtain a minimum edge interval value in a case where the edge interval value FREQ is a maximum edge interval value of one frame. For example, when the maximum edge interval value is four times the minimum edge interval value, the edge interval value FREQ is divided by 4, and a signal having pulses having a time period obtained by dividing the edge interval value FREQ by 4 becomes the latch pointer signal LATPTR.

Figure 7:
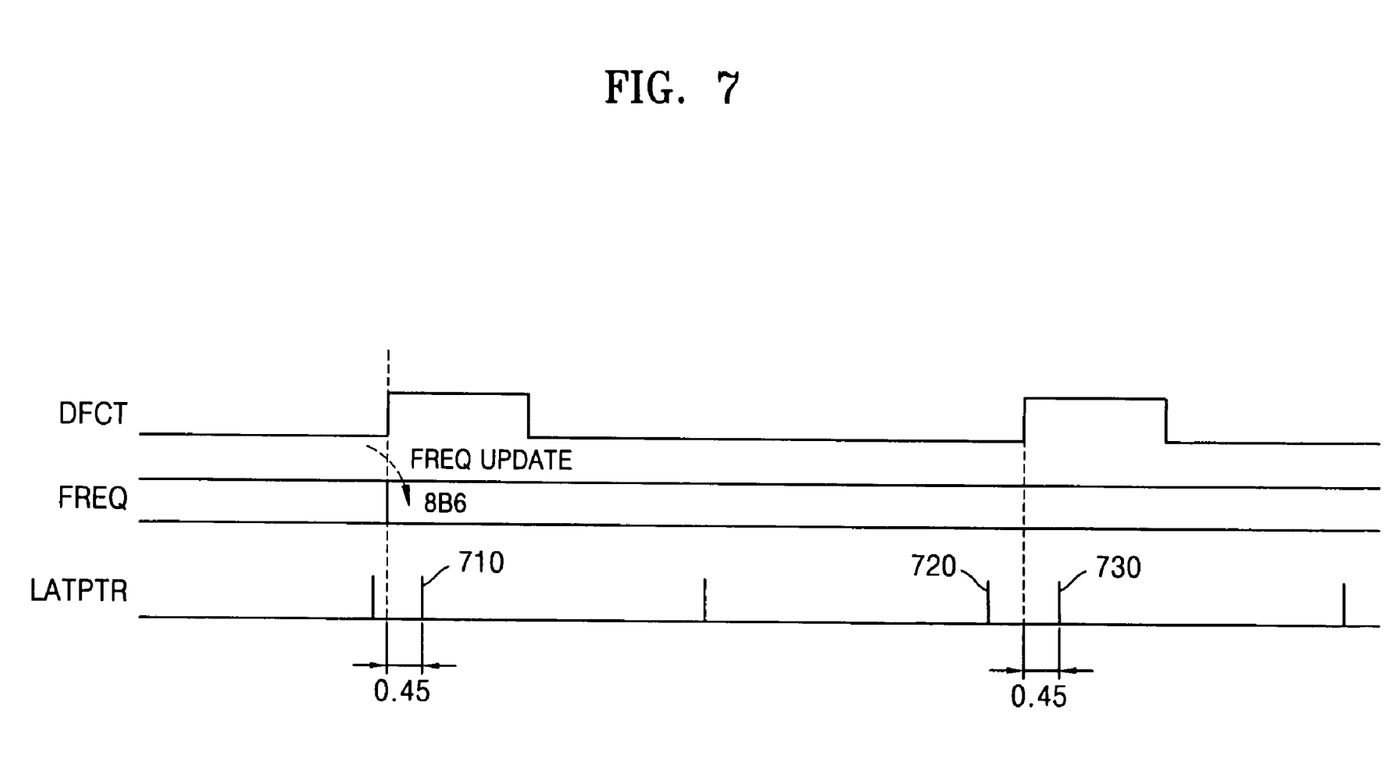
FIG. 7 is a timing diagram illustrating a latch pointer signal according to exemplary embodiments of the invention.

As indicated by reference number 710 of FIG. 7, when the edge interval value FREQ is updated, the latch pointer signal LATPTR is activated a constant interval (=0.45) after activation of the defect signal DFCT. However, if a subsequent pulse of the latch pointer signal LATPTR, which has the same time period, is output next to a pulse (720 of FIG. 7) of the latch pointer signal LATPTR output just before a subsequent leading edge of the defect signal DFCT is detected, the subsequent pulse of the latch pointer signal LATPTR cannot be activated the constant interval (=0.45) from the subsequent leading edge of the defect signal DFCT. Therefore, the latch pointer signal generator 260 can compensate for a pulse location of the latch pointer signal LATPTR every time when a leading edge of the defect signal DFCT is detected at Blocks 630 and 640. When leading edges of the defect signal DFCT are detected, the edge signal EDGE generated by the edge detector 252 included in the frequency detector 250 is referred to. Accordingly, the latch pointer signal generator 260 can compensate and output a location of the latch pointer signal LATPTR every time the edge signal EDGE is active, at Block 650. The reference number 730 of FIG. 7 shows a compensated pulse of the latch pointer signal LATPTR, which is activated the constant interval (=0.45) after the subsequent leading edge of the defect signal DFCT.

In FIG. 2, the decoder 240 generates the BCA data by decoding the signal obtained by sampling the defect signal DFCT according to the latch pointer signal LATPTR.

As described above, in optical disk players 200 according to exemplary embodiments of the present invention, when the frequency detector 250 detects the edge signal EDGE from the defect signal DFCT and updates and outputs the maximum/minimum edge interval value FREQ indicating a rotational frequency of the optical disk in a given frame, the latch pointer signal generator 260 compensates and outputs a location of the latch pointer signal LATPTR when the edge signal EDGE is active. The decoder 240 generates the BCA data by decoding the signal obtained by sampling the defect signal DFCT according to the latch pointer signal LATPTR.

As described above, since an optical disk player according to exemplary embodiments of the present invention can decode BCA data of an optical disk by automatically detecting a rotational frequency of the optical disk in a CLV mode without using a CAV mode control, pins for an FG signal do not have to be added to a CAV motor or a chip. A CAV motor also may not need to be provided. Accordingly, manufacturing cost and/or hardware complexity may be reduced.

In the drawings and specification, there have been disclosed embodiments of the invention and, although specific terms are employed, they are used in a generic and descriptive sense only and not for purposes of limitation, the scope of the invention being set forth in the following claims.

What is claimed is:

1. An optical disk player comprising:
   a radio frequency (RF) unit configured to generate an RE signal from information stored on an optical disk;
   a defect signal detector configured to generate a defect signal from the RF signal;
   an enable unit configured to detect a maximum or minimum edge interval value from among a plurality of edge interval values by a plurality of leading edges generated in each frame of burst cutting area (BCA) information included in the defect signal and generating a latch pointer signal corresponding to a disk rotational speed based on the detected maximum or minimum edge interval value; and
   a decoder configured to generate BCA data by decoding the defect signal using the latch pointer signal;
   wherein the enable unit comprises:
   a frequency detector configured to detect edge signals indicating the leading edges, to update the maximum or minimum edge interval value indicating the disk rotational speed of the optical disk for a respective frame, and to output the updated interval value; and
   a latch pointer generator configured to generate the latch pointer signal based on the maximum or minimum edge interval value and to compensate for a location of the latch pointer signal; and
   wherein the frequency detector comprises:
   an edge detector configured to detect the edge signal, to count the leading edges, and to generate a frame signal indicating one frame;
   an edge interval detector configured to calculate and output interval values between the leading edges;
   a storage unit configured to update and store an interval value that is output from the edge interval detector only if the interval value is larger than a previous interval value in a frame, and to maintain and output a value updated as the maximum edge interval value of one frame during a subsequent frame in response to the frame signal; and
   a loop filter configured to filter the updated maximum edge interval value in response to the frame signal, and to output the filtered value as an edge interval value indicating the rotational frequency of the optical disk.

2. The optical disk player of claim 1, wherein the disk rotational speed of the optical disk is a rotational speed of the optical disk when the optical disk operates in a constant linear velocity (CLV) mode.

3. The optical disk player of claim 1, wherein the loop filter comprises:
   a subtractor configured to generate an error value by subtracting the filtered value from the updated maximum edge interval value;
   a gain adjuster configured to adjust a reflection degree of the error value and to output an adjustment value; and
   a low pass filter configure to low-pass-filter the adjustment value in response to the frame signal and to output the low-pass-filtered value.

4. The optical disk player of claim 3, wherein the low pass filter is configured to output a value, which begins from a predetermined initial value and is increased or decreased by a predetermined value according to the error value, as the low-pass-filtered value.

5. The optical disk player of claim 1, wherein the latch pointer signal has a time period corresponding to a value obtained by dividing the maximum edge interval value by a constant.

6. The optical disk player of claim 1, wherein the latch pointer signal is activated a constant time interval after activation of the edge signal.

7. A Burst Cutting Area (BCA) data decoding method in an optical disk player, comprising:
   generating a radio frequency (RF) signal from information stored on an optical disk;
   generating a defect signal from the RF signal;
   determining a frame by counting a plurality of leading edges of the defect signal, detecting a maximum or minimum edge interval value from among edge interval values of a plurality of leading edges indicating a rotational frequency generated in the frame, and generating the detected maximum or minimum edge interval value;
   generating a latch pointer signal corresponding to a rotational speed of the optical disk according to the detected maximum or minimum edge interval value;

generating BCA data by decoding the defect signal using the latch pointer signal; and detecting edge signals indicating the leading edges, wherein the maximum or minimum edge interval value indicating the rotational frequency of the optical disk is updated for a respective frame and a location of the latch pointer signal is compensated when an edge signal is active; and wherein the determining the frame comprises:

counting the leading edges and generating a frame signal indicating one frame;

calculating and outputting interval values between the leading edges;

updating and storing a corresponding interval value only if the interval value is larger than a previous interval value in a frame;

maintaining and outputting a value updated as the maximum edge interval value of one frame during a subsequent frame in response to the frame signal; and filtering the updated maximum edge interval value in response to the frame signal and outputting the filtered value as an edge interval value indicating the rotational frequency of the optical disk.

8. The method of claim 7, wherein the rotational frequency of the optical disk is a rotational frequency of an optical disk when the optical disk operates in a constant linear velocity (CLV) mode.

9. The method of claim 7, wherein the filtering of the updated maximum edge interval value comprises:

generating an error value by subtracting the filtered value from the updated maximum edge interval value;

adjusting a reflection degree of the error value and outputting an adjustment value; and low-pass-filtering the adjustment value in response to the frame signal and outputting the low-pass-filtered value.

10. The method of claim 9, wherein the low-pass-filtered value begins from a predetermined initial value and is increased or decreased by a predetermined value according to the error value.

11. The method of claim 7, wherein the latch pointer signal has a time period corresponding to a value obtained by dividing the maximum edge interval value by a constant.

12. The method of claim 7, wherein the latch pointer signal is activated a constant time interval after the edge signal is activated.

* * * * *